United States Patent [19]

Brooks et al.

[11] 4,272,297

[45] Jun. 9, 1981

[54] COMPOSITIONS FOR USE WITH PAPERMAKING FILLERS

[75] Inventors: Kenneth Brooks, Longfield; Leslie E. Shiel, Gravesend; David E. Smith, Longfield, all of England

[73] Assignee: Blue Circle Industries Limited, London, England

[21] Appl. No.: 77,095

[22] Filed: Sep. 19, 1979

[51] Int. Cl.³ ............................................. C09C 1/02
[52] U.S. Cl. ................................. 106/306; 106/214; 106/308 C
[58] Field of Search ........... 106/213, 214, 306, 308 C; 162/168 N, 168 NA

[56] References Cited

U.S. PATENT DOCUMENTS

| | | | |
|---|---|---|---|
| 2,007,436 | 4/1937 | Rafton . . | |
| 3,661,610 | 5/1972 | Ferris | 106/306 |
| 3,940,550 | 2/1976 | Delfosse et al. | 106/214 |
| 3,945,843 | 3/1976 | Holty et al. | 106/306 |
| 4,174,998 | 11/1979 | Shiel | 106/308 C |

FOREIGN PATENT DOCUMENTS

| | | |
|---|---|---|
| 1368387 | 9/1974 | United Kingdom . |
| 1451108 | 9/1976 | United Kingdom . |
| 1497280 | 1/1978 | United Kingdom . |
| 1514428 | 6/1978 | United Kingdom . |

*Primary Examiner*—James Poer
*Attorney, Agent, or Firm*—Brooks, Haidt, Haffner & Delahunty

[57] ABSTRACT

A composition for flocculating filler in aqueous suspension for use in papermaking, comprising a starch, an organic polyelectrolyte capable of flocculating mineral filler particles in aqueous suspension, and at least one agent capable of regulating the mobility of a dispersion, particularly a substance moderating flocculation of suspended filler or a substance moderating the viscosity of the dispersion.

16 Claims, No Drawings

COMPOSITIONS FOR USE WITH PAPERMAKING FILLERS

This invention relates to compositions for use in the manufacture of paper with mineral fillers such as clay, lithopone, barium sulphate, titanium pigments, talc, satin white, and calcium carbonate, for instance chalk whiting. More particularly the invention relates to such compositions also containing a starch.

Such mineral fillers are included in the furnish for the manufacture of various types of paper. As the proportion of filler to cellulose increases, the opacity of the eventual paper increases but the strength properties tend to decrease and moreover the fillers tend to be lost into the water drained from the wet formed paper web, so that it is usual to add so-called retention aids. These are normally polymers of high molecular weight, particularly organic polyelectrolytes, which tend to flocculate together the filler particles and the cellulose fibres.

It has previously been proposed to provide a pre-flocculated filler composition, that is to say one in which the filler is accompanied in aqueous suspension by a flocculant which modifies the condition and in some cases the effective particle size of the filler before the composition is introduced to the paper furnish. Such a pre-flocculated filler composition has an enhanced ability to flocculate onto the fibre, enabling higher filler or pigment loading to be achieved in paper while maintaining good strength, optical and other paper properties.

It is also known to add so-called beater starches i.e. pre-gelatinised starches, at the wet end to enhance the strength of the paper, but conventional beater starches are limited in their use in the paper industry because of their poor retention properties, and the ensuing biological oxygen demand problems in effluent water. These starches are, however, comparatively low in cost.

It is an object of the invention to provide an improved aqueous filler composition of the pre-flocculated type, which exhibits improved retention in the wet formed paper web whilst maintaining desired properties in the dried sheet. It is a further object of the invention to provide a flocculant composition, containing an organic polyelectrolyte for use in the preparation of the aforesaid improved filler composition.

The invention fulfils the foregoing objects in general by the inclusion of a starch especially a cold-water-soluble starch, in the flocculant composition used in the preparation of the filler. The incorporation of starch in aqueous suspensions containing organic polyelectrolytes incurs difficulties which may be loosely referred to as thickening phenomena, but we have found that agents capable of restraining this behaviour can be used to good effect. We have further found that a composition containing such an agent, a starch and an organic polyelectrolyte enables a novel technique to be adopted for producing the pre-flocculated filler system.

Hitherto, pre-flocculated systems have been attained by separate solubilization of the flocculating polymer, such as an organic polyelectrolyte with flocculant properties, in water, which is then added to the filler in slurry form. It is found that when contacted in aqueous suspension with an organic polyelectrolyte, such as a polyacrylamide flocculant or retention aid, starches are liable to undergo an interaction with the polyelectrolyte, imparting visco-elastic properties which would be difficult to handle if such a suspension were to be used on a paper manufacturing scale of operation. The invention can, however, be applied to the separate solubilisation technique of pre-flocculation.

In another aspect of the invention, we have found a polymer composition which contains starch and can be added in dry form directly to the filler slurry, which greatly simplifies the pre-flocculation process and aids the servicing of large papermaking machines with pre-flocculated filler. In this direct addition process solubilisation and flocculation occur simultaneously, which but for the invention would introduce severe practical difficulties. This is because of the competition for water, between that required for the solubilisation of polymer and that immobilised as a result of the structurisation by flocculation. This does not occur to the same degree in the separate solubilisation technique because water is readily available for solubilisation.

The thickening phenomena referred to above are typically due to two effects:
(a) viscosity increase on the solubilisation of the starch;
(b) structure induced by flocculation of the filler particles.
These phenomena are more precisely generalised as loss of mobility in the aqueous suspension.

According to the present invention we provide a composition, for flocculating filler in aqueous suspension intended for use in a papermaking furnish, comprising: (a) a starch, which may be anionic, cationic, or non-ionic, and especially a cold-water-soluble pregelatinised type of starch, or a blend of such starches, (b) an organic polyelectrolyte capable of flocculating mineral filler particles in aqueous suspension, and (c) an agent capable of regulating the mobility of a dispersion.

The invention further provides a filler composition for use in a papermaking furnish and comprising the foregoing composition of (a), (b) and (c), in an aqueous suspension of the filler.

In one aspect of the invention appropriate particularly to the abovementioned direct addition method, the agent is a substance effective to moderate the flocculation of the suspended filler and thereby maintain the mobility of the dispersion. In another aspect of the invention the agent is a substance, particularly an inorganic electrolyte, effective to maintain the mobility of the polymer dispersion by moderating its viscosity. Preferably the compositions of the invention include both an agent to moderate flocculation and an agent to moderate viscosity.

In preferred compositions according to the invention the starch is an anionic or, more preferably, non-ionic cold water soluble starch and the organic polyelectrolyte is a cationic flocculant or retention aid.

Examples of non-ionic soluble starches are Stadex 601, 604, 608, and 609 (Starch Products), Cellocol S and Cellocol LZ (Tunnel Avebe). Anionic starches which may be mentioned include Stadex 7410 (Starch Products) and Retabond AP (Tunnel Avebe).

Cationic polyelectrolytes of interest in this connection include the polyacrylamide derivatives Percol 140, 292, and 455, and DSR 1256, DSR 341 (Allied Colloids) and Reten 210 (Hercules).

It is contemplated that the resulting filler compositions will be applicable to paper stocks containing mechanical pulps as well as to stocks containing chemical pulps.

As already indicated, the components of the eventual filler composition may be brought together in various ways. In one embodiment of the invention a flocculant composition containing the starch, the polyelectrolyte and a substance effective to moderate the flocculation of suspended filler is added in dry form directly to an aqueous slurry of the filler such as is used in paper-making. Direct addition of dry polymer to filler slurry permits a higher final filler solids content in the pre-flocculated filler mix than would otherwise be feasible, e.g. by an increase of up to 50 percent by weight, i.e. from 30 percent solids to 45 percent solids. This increase is most useful in enabling large paper machines to be serviced by equipment of reasonable size.

In another embodiment the flocculant composition containing starch and the organic polyeletrolyte is solubilised in water, i.e. brought into a state of homogeneous molecular dispersion in water, in the presence of a substance effective to moderate the viscosity of the dispersion, before incorporation of the dispersion in the aqueous filler suspension. In this embodiment a substance effective to moderate flocculation may also be incorporated from the outset or it may be added at a later stage during the introduction of the solubilised dispersion to the filler suspension.

The agent for regulating the mobility of the dispersion containing filler by moderating flocculation may, for example, be sodium polyphosphate. Other examples of such agents are alkali metal polyacrylates, polyvinyl pyrrolidone, dicyandiamide, and certain of the gums and resins classed as dry-strength resins.

The viscosity of the solution containing starch and polyelectrolyte may be moderated to reduce the viscoelastic tendency by the incorporation of an inorganic electrolyte, preferably an acid donor, which has the advantage of preventing the Weissenberg effect encountered in stirring such solutions, whereby thickened material rises up the stem of an applied stirrer. Suitable inorganic electrolytes include aluminium sulphate (conveniently papermakers' alum).

Moreover the use of the inorganic electrolyte, particularly aluminium sulphate, not only improves retention but reduces biological oxygen demand in the system effluent, and may reduce the amount of organic polyelectrolyte, particularly cationic polyelectrolyte, required to effect flocculation.

The invention not only offers the advantage that higher filler loadings can be achieved than hitherto, but also the advantage that the suspensions can be prepared with relatively simple and readily available equipment.

According to a further feature of the invention a cross-linking agent for the starch, such as glyoxal, or an epoxy resin, may be added.

According to another further feature of the invention we may include in the composition a dry-strength additive for paper, whereby an increase in dry strength is achieved together with the improved retention. Such addition can be advantageous in particular when the composition is to satisfy the requirements associated with a paper stock containing mechanical pulp, which is more demanding in terms of binder than are chemical pulps.

As dry-strength additives there may be used any of those known as such in the papermaking art. These include natural substances, principally gums for example mannogalactans such as xanthan gum, as well as synthetic resins, e.g. Accostrength (American Cyanamid) an acrylic/acrylamide resin, Bubond 65 (Buckman Laboratories) a copolymer of a polyacrylate and a quaternary ammonium compound, and modified polyacrylamide dry-strength resins (Allied Colloids). In some instances dry-strength additives can serve the dual role of binder and flocculant.

The filler compositions of the invention are intended to be used as such in papermaking, that is to say the ingredients of the composition, which may include alum as described above, are brought together as a dispersion in water, before being introduced into the paper fibre stock. Organic polymeric retention aids may also be included or added separately from the other ingredients generally as late as possible onto the machine before the formation of the paper web. The compositions are normally added to the papermaking system after the addition of the sizing chemicals, for example at the fan pump.

By "cold-water-soluble" we mean that the starch shall be capable of dissolving in water at 20° C. within 30 minutes to give a 5 percent by weight solution.

The filler, polymeric and other components of the filler composition are incorporated therein in the state, e.g. as to particle size, and in a manner, normal in the known art associated with papermaking, except as otherwise stated herein. The four essential and any other constituents of the filler composition are applied to the papermaking furnish as a pre-flocculated filler in the amount to give the desired filler loading in the paper.

The compositions provided by the invention give excellent retention of the starch, and can be employed not only in conjunction with conventional rosin sizing systems employing alum, but also find application in alkaline and neutral sizing systems (e.g. "Aquapel" or "Fibran").

The filler may be any of the pigment components mentioned above. An additional advantage of the invention in cases where the filler includes a chalk whiting is that it enables the filler to be used in acid systems in which its use hitherto has been inhibited by its susceptibility to attack by acid, as a result of the use of papermakers' alum, resulting in the loss of sizing and in other undesirable side effects.

In the following further description and Examples, the proportions of ingredients are expressed as percentages based on the weight of filler in the eventual composition.

In general the amount of starch or blend of starches employed will be from 0.5 percent to 10 percent, more usually from 2 percent to 7 percent. The amounts of organic polyelectrolyte such as polyacrylamide, and of agents for regulating mobility, as well as of cross-linking agents, will each range generally up to about 1 percent, the preferred amount of polyacrylamide being from 0.10 percent to 0.30 percent and the preferred amount of each of the other agents being from 0.05 percent to 0.50 percent.

The following Examples are given for the purpose of illustrating the invention. "Snowcal 8SW" referred to in the Examples is a chalk whiting available from Blue Circle Industries Limited, of British Whiting Federation grade BWF42. An alternative whiting is Snowcal 4ML, Grade BWF 30.

In the following Examples, the percentages are by weight based on the filler solids, so that each formulation provides a total of 4 percent by weight of the filler when applied to the suspension of filler.

(A) Formulations for dispersion in water before incorporation in a filler suspension:

EXAMPLE 1

| Starch (Stadex 7410) | 3.65% |
|---|---|
| Polyacrylamide (Percol 455) | 0.20% |
| Alum | 0.15% |

EXAMPLE 2

| Starch (Cellocol S) | 3.65% |
|---|---|
| Polyacrylamide (Percol 292) | 0.20% |
| Alum | 0.15% |

EXAMPLE 3

| Starch (Retabond AP) | 3.65% |
|---|---|
| Dry strength resin (DSR 1256) | 0.20% |
| Alum | 0.15% |

EXAMPLE 4

| Starch (Cellocol LZ) | 3.70% |
|---|---|
| Polyacrylamide (Reten 210) | 0.15% |
| Alum | 0.15% |

(B) Dry compositions for direct addition to a slurry of filler:

EXAMPLE 5

| Starch (Cellocol S) | 3.55% |
|---|---|
| Polyacrylamide (Percol 292) | 0.15% |
| Sodium polyphosphate (Tetron) | 0.15% |
| Alum | 0.15% |

EXAMPLE 6

| Starch (Cellocol LZ) | 3.35% |
|---|---|
| Dry strength resin (DSR 1256) | 0.20% |
| Alum | 0.15% |
| Dicyandiamide | 0.20% |
| Polyvinyl pyrrolidone | 0.10% |

EXAMPLE 7

| Starch (Cellocol S) | 3.35% |
|---|---|
| Polyacrylamide (Percol 292) | 0.20% |
| Alum | 0.15% |
| Dicyandiamide | 0.20% |
| Polyvinyl pyrrolidone | 0.10% |

Laboratory handsheets have been prepared using the above formulation in a slurry of Snowcal 8SW and compared with handsheets containing approximately the same amount of filler, i.e. 12.0 percent by weight calcium carbonate based on the weight of the paper, using a "Bumal"/alum sizing system.
The following results were obtained.

| Test | Ordinary whiting Snowcal 8SW | Preflocculated Filler according to Example 7 |
|---|---|---|
| Burst Ratio | 3,51 | 4.71 |
| Breaking Length | 5743 | 7503 |
| Cobb sizing (1 min.) | 60 | 19 |

The polymer formulation of Example 7 has been used on a miniature papermachine under conditions more akin to those appertaining on a full size papermachine. In this case the amount of chalk whiting by weight based on the weight of paper was 10 percent and the "Aquapel 360" neutral sizing system was used. The following results were obtained.

| Test | Ordinary whiting Snowcal 8SW | Preflocculated filler according to Example 7 |
|---|---|---|
| Burst Ratio | 1.70 | 2.70 |
| Breaking Length | 4686 | 6698 |

EXAMPLE 8

| Starch (Cellocol S) | 3.35% |
|---|---|
| Polyacrylamide (Percol 292) | 0.20% |
| Alum | 0.15% |
| Xanthan gum (Kelzan, from Kelco Chemicals) | 0.15% |

Laboratory handsheets have been prepared using the above formulation in a slurry of Snowcal 8SW chalk whiting and compared with handsheets containing approximately the same amount of calcium carbonate, i.e. 12 percent, using a "Bumal"/alum sizing system. The following results were obtained.

| Test | Ordinary whiting Snowcal 8SW | Preflocculated filler according to Example 8 |
|---|---|---|
| Burst ratio | 3.51 | 4.47 |
| Breaking length | 5743 | 6992 |
| Cobb sizing (1 min.) | 60 | 20 |

The tests referred to in the foregoing Examples are TAPPI tests, as follows: Bursting strength, T403/76; Breaking length, T404/76; and Cobb sizing, T441/77.

We claim:
1. A composition for flocculating filler in aqueous suspension intended for use in a papermaking furnish, comprising:
(a) at least one starch, (b) an organic polyelectrolyte capable of flocculating mineral filler particles in aqueous suspension, and (c) at least one agent capable of regulating the mobility of a dispersion.
2. A composition according to claim 1, containing as an agent (c) substance effective to moderate the flocculation of a suspended filler and thereby maintain the mobility of a dispersion of filler.
3. A composition according to claim 1, or 2, containing as an agent (c) a substance effective to maintain the mobility of the polymer dispersion by moderating its viscosity.
4. A composition as claimed in claim 3, solubilised in water.

5. A composition according to claim 2, in the form of a dry solid mixture.

6. A composition according to claim 1, further comprising (d) a mineral filler in aqueous suspension.

7. A composition according to claim 6, wherein the mineral filler is calcium carbonate.

8. A composition according to claim 7, wherein the filler is chalk whiting.

9. A composition according to claim 1 wherein the starch is an anionic cold-water-soluble starch and the organic polyelectrolyte is cationic.

10. A composition according to claim 1, wherein the starch is a non-ionic cold-water-soluble starch and the organic polyelectrolyte is cationic.

11. A composition according to claim 2, wherein as a substance effective to moderate flocculation there is present a sodium polyphosphate, an alkali metal polyacrylate, polyvinyl pyrrolidone, dicyandiamide, or xanthan gum.

12. A composition according to claim 3, wherein as a substance effective to moderate viscosity there is present an inorganic electrolyte.

13. A composition according to claim 12, wherein the inorganic electrolyte is alum.

14. A composition according to claim 1 further comprising a cross-linking agent for the starch.

15. A composition according to claim 1 further comprising a dry-strength additive for paper.

16. A method of preparing a pre-flocculated filler for use in a papermaking furnish which comprises introducing a composition as claimed in claim 5 into an aqueous slurry of the filler.

* * * * *